United States Patent

Kampfer

[15] 3,646,752

[45] Mar. 7, 1972

[54] PLASTIC ENCASED METAL RIBBED FLEXIBLE CONVEYOR CHAIN

[72] Inventor: David H. Kampfer, St. Paul, Minn.
[73] Assignee: Conveyor Specialties Company, St. Paul, Minn.
[22] Filed: Sept. 28, 1970
[21] Appl. No.: 75,998

[52] U.S. Cl. ..................... 59/78, 59/84, 74/250 C, 198/189
[51] Int. Cl. .......................................... F16g 15/12
[58] Field of Search ............................ 59/78, 80, 82, 90, 84; 198/189; 74/246, 250 R, 250 C, 251 R, 251 C

[56] References Cited

FOREIGN PATENTS OR APPLICATIONS 697,288  11/1964  Canada.................................59/79
1,364,796  5/1964  France.................................198/189
1,400,393  4/1965  France.................................198/189

Primary Examiner—Charles W. Lanham
Assistant Examiner—Gene P. Crosby
Attorney—Frank B. Hill

[57] ABSTRACT

An improved flexible conveyor chain with side flexing capability while retaining good cross-sectional areas at stress positions. The chain structure is made of metal rib sections encased in plastic material which provides positive positioning and even cooling effects during manufacturing and strength in useage. The plastic material reduces or eliminates the need for chain lubrication. The edges of the chain elements have ramp edges to assist in ease of loading and unloading material to be moved by the conveyor chain.

4 Claims, 5 Drawing Figures

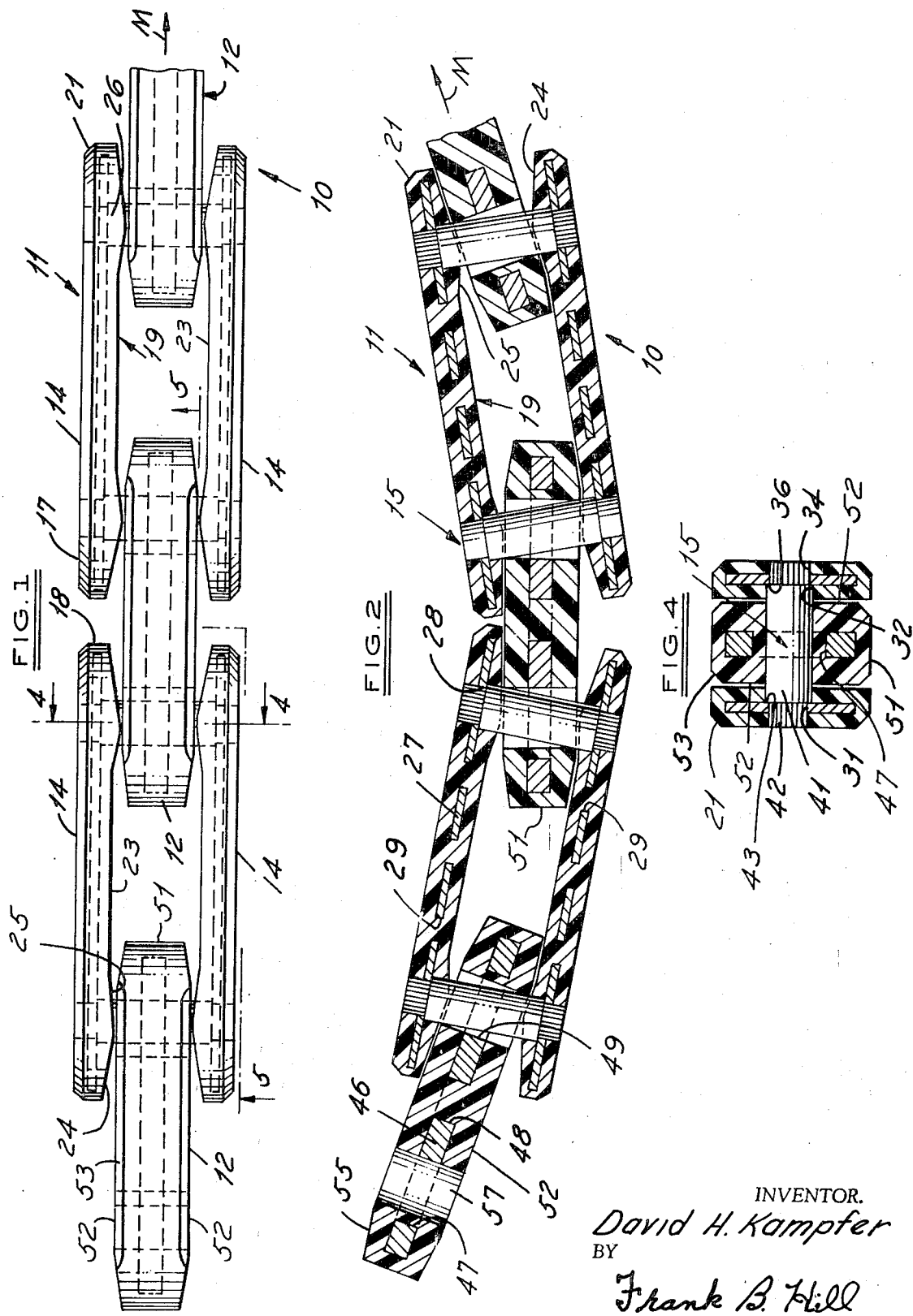

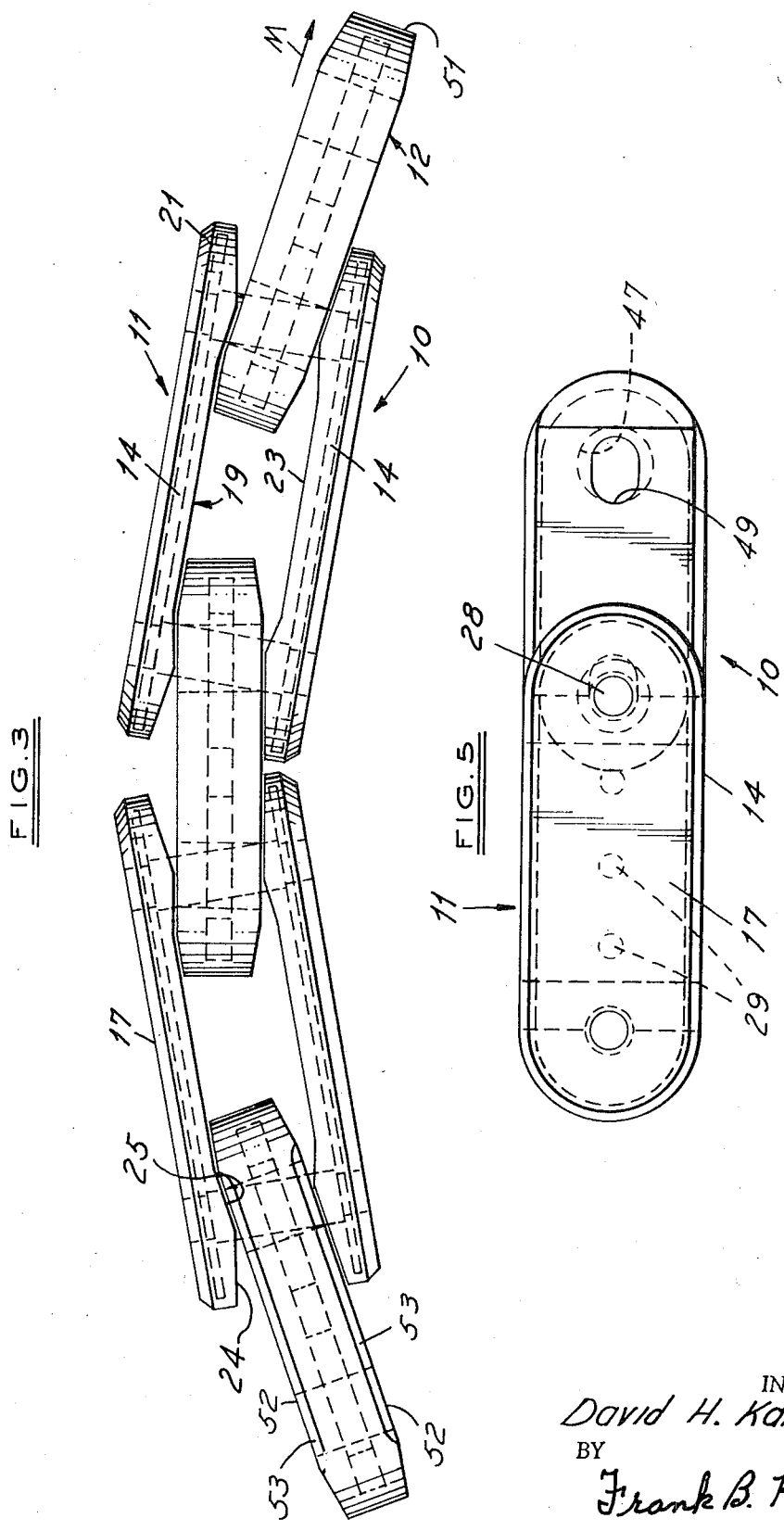

PLASTIC ENCASED METAL RIBBED FLEXIBLE CONVEYOR CHAIN

This invention relates generally to a metal ribbed, plastic encased, side flexible conveyor chain assembly and more particularly to a metal ribbed conveyor chain assembly having uniquely shaped outer chain assemblies and center bar assemblies which have knurled end pins which facilitate ease of assembly while providing positive and accurate locating means.

Continual improvement and advancement is being made in various manufacturing and assembly facilities in a direction of automating production activities. One of the major thrusts is in eliminating labor which is doing manual type of activities that can be accomplished as well or better by programmed and automated systems.

This type of automation advancement is being completed in the packaging field for both food and nonfood items. Many industries, such as the diary industry, are moving to larger and more centralized dairy product packaging plants. These centralized plants require longer conveyor lines and more flexability in the direction of the conveyor lines. There is a need to reduce maintenance to a minimum while providing as much flexability in the systems as possible. Because the conveyor acts on food items, it is desirable if lubricants can be reduced or eliminated, helping to eliminate the unsightly appearance and the maintenance requirements. Some of the conveyor lines extend over long distances and in order to conserve floor space and provide the flexability, curved paths are required. As the length of the line increases, strength is important to be present in the chain assembly. Reductions in weight of the chain without elimination of needed strength is a desirable feature. One of the principal objections of the present invention is to provide a flexible conveyor chain which gives a good range of side flexing capacity and provides necessary strength at the needed areas.

Another object of the present invention is to provide a side flexing conveyor chain assembly which can move over extended lengths of distance and where lubrication characteristics will be inherent in the material and will not be required externally on the chain.

A still further object of the present invention is to provide a conveyor chain, having side flexability features while providing ramped edges to assist in loading and unloading items to be transferred, eliminating or reducing to a minimum hangups of the products being transferred and damage to the conveyor system.

A still further object of the present invention is to provide a flexible conveyor chain having the features of the present invention, including a steel center bar encased in plastic, which assists in manufacturing by providing cooling characteristics when the elements are being formed so even cooling will take place in the plastic while at the same time providing additional strength and positive locating of the necessary elements during assembly and use.

Also, an object of the present invention includes the provision of a side flexible encased steel center bar chain capable of accomplishing the above specified objectives with a minimum of material and equipment costs and manufacturing expense; and at the same time being composed of simple, interchangeable and ruggedly formed structures which will be extremely flexible and useful in application.

To the accomplishment of the foregoing and related ends, the invention then consists of the means and features hereinafter fully described and particularly pointed out in the claims. The annexed drawings and the following description setting forth, in detail, certain means for carrying out this invention. Such disclosed means illustrating, however, one of various ways in which the principles of the invention may be used.

In the annexed drawings:

FIG. 1, is a top plan view of a side flexible conveyor chain assembly and illustrating the principles of the present invention.

FIG. 2, is a partial cross-sectional top plan view of a side flexible conveyor chain assembly as illustrated in FIG. 1, flexing in a left direction when viewed from the left of the drawing to the right of the drawing.

FIG. 3 is a top plan view of a side flexible conveyor chain assembly as illustrated in FIG. 1, flexing in a right direction when viewed from the left of the drawing to the right of the drawing.

FIG. 4, is a partial cross-sectional view taken along the pin member, showing the structure of the side flexible conveyor chain assembly, taken generally along line 4—4 of FIG. 1.

FIG. 5, is a partial side elevated view of a side flexible conveyor chain assembly showing the center bar assembly and its relationship to the side bar member, taken generally along line 5—5 of FIG. 1.

A general description of this invention is a side flexible conveyor chain assembly having chain elements made up of two interchangeable side bar members forming an outer chain assembly and a center bar assembly which connects adjacent outer chain assemblies which are made up of two side bar members by knurled end locating or surface pins. The side bar members are so constructed as to provide the largest cross-sectional area where the locating pins are acting. Thus maintaining good strength at the work area. The pins are provided with knurled ends which can act both on the metal rib members positioned in the side bar members and the plastic encasing material, to provide positive positioning of the locating pins and easy assembly of the conveyor chain assembly. The locating pins are provided with locating shoulders which act on metal surfaces to provide proper spacing between the side bar members. Tapered surfaces are provided on the side bar members and on the end of the center bar assembly to permit flexing of the conveyor chain around curved paths and providing space for the chain to flex during the curved portion of its travel.

Referring generally to the figures, there is illustrated a flexible conveyor chain generally referred to by numeral 10. The flexible conveyor chain assembly 10 is made up of a series of outer chain assembly members and center bar assembly members that are connected together to form an endless chain. This basic concept is a practice well known in the art. The specific elements forming the present flexible conveyor chain 10 are referred to as outer chain assembly 11 and center bar assembly 12. The function and structure of these individual elements will be explained in detail below.

The outer bar assembly 11 is provided with two side bar members 14 which are connected together by two pin members 15. The side bar members 14 have the same structural form and are positioned opposite of each other on the ends of the pin members 15 as shown in FIG. 1; for example, and will be explained in more detail below. The side bar member 14 has an outer surface 17, a circumferential surface 18 and an inside surface 19. The outer surface 17 is connected to the circumferential surface 18 by a ramp edge 21. The inside surface 19 has a central portion 23, an outer tapered surface 24 and an inner tapered surface 25, at each end. The central portion 23 and outer tapered surface 24 act together to form a load section 26 to act with the pin members 15 as will be explained below in detail.

The outer bar member 14 has a metal rib 27 which is substantially positioned in its central portion. The metal rib 27 is provided with locating or pin surfaces 28. The metal rib 27 also provides for passage holes 29. The side bar members 14 are provided with pin holes 31 which are made up of pin body hole 32 and knurl hole 34, both of which are substantially aligned with the locating or pin surface 28. A shoulder surface 36 is provided on the metal rib 27 as best viewed in FIGS. 2 and 4.

The side bars members 14 of the outer chain assembly 11 are held together in spaced relationship by pin members 15. The pin member 15 has a pin body surface 41 with a predetermined diameter dimension with two knurled ends 42 which have an outer diameter less than the diameter of pin body surface 41 and have a shoulder 43 which connects them. When the outer chain assembly 11 is assembled, the pin body surface 41 will be positioned in the pin body hole 32. The distance between the two side bar members 14 will be predetermined by the shoulder 43 acting on the shoulder surface 36. The pin member 15 will be firmly secured in assembled position by the knurling end 42 acting with the knurl hole 34 and the locating or pin surface 28 of the metal rib 27. The shoulder surface 36 gives a positive surface for the shoulder 43 to be located off of, providing a predetermined centered spacing of the side bar members 14 and their various elements.

The center bar assembly 12 is provided with a metal rib 46 which has end openings 47 and passage holes 48. The end opening 47 has a locating surface 49, the function of which will be discussed in more detail below. The center bar assembly 12 has an outer surface 51 which extends around and is the circumference of the center bar assembly 12. The center bar assembly 12 has side surfaces 52. At the upper and bottom portions of the center bar assembly 12 as best viewed in FIG. 4, ramp edges 53 connect the side surface 52 and the outer surface 51. Tapered ends 55 are provided on both ends of the center bar assembly 12. Elongated pin holes 57 are provided in the center bar assembly 12 to permit the pin members 15 to pass through the center bar assembly and act with the body surface 41 of the pin 15. When the flexible conveyor chain 10 is finally assembled, the pin member 15 will be passed through the elongated pin holes 57 before the side bar members 14 are held in place by the knurl ends 42 as discussed above.

It should be noted that the widest cross section of the side bar member 14 is the load section 26 which is well positioned substantially at the axis of the pin member 15, giving the biggest bulk of strength where the load is carried. At the same time, the largest width of the center bar assembly 12 is where the elongated pin holes 57 act with the pin member 15. The chain structure permits substantial flexability of the conveyor chain 10 by providing the outer tapered surface 24 and the inner tapered surface 25 on the side bar members 14 and the tapered ends 55 at the ends of the center bar assembly 12. When the flexible conveyor chain 10 is moved in the direction of the arrow indicated by the letter M, the center bar assembly 12 will have its trailing elongated pin hole 57 pulling on the pin member 15 its associated with. The leading elongated pin hole 57 will be moved forward by having the pin member 15 acting on the leading edge of its elongated pin hole 57. The tapered surfaces 24 and 25, and ends 55, permit the conveyor chain 10 to flex during its travel on curved paths while at the same time permitting maximum cross sections to receive full thrust of the load on the conveyor chain. FIG. 2, generally illustrates a left turn and FIG. 3, generally illustrates a right turn, when the conveyor chain 10 is traveling in the M direction.

During manufacturing, the locating or pin surfaces 28 act as positive locating surfaces to have the outer plastic shell of the side bar member form around the metal rib 27. The metal rib 27 also provides passage holes 29 which assist in securing the outer plastic shell and the metal rib 27 together in a strong bond structure. Because of the large width provided at the load section 26, and the length of the side bar member 14, good cooling characteristics are necessary to provide a good finished part. If good cooling characteristics are not provided, warpage and distortion will occur in the part. The metal rib provides cooling characteristics for the encasing material which can be cast out of plastic material such as Delrin, for example. The locating pin surface 28 gives a positive positioning in the casting where the parts are formed and also for the side bar member 14 when the outer chain assembly 11 is formed by providing a metal shoulder surface 36 to act with the shoulder 43 of the pin member 15.

The center bar assembly 12 is provided with the metal rib 46 which acts in a similar manner to the side rib 47 to provide cooling characteristics in the casting operation when the part is produced. The outer shell of the encasing material can be made of plastic, such as, Delrin. The end openings 47, as best viewed in FIG. 5, are larger than the elongated pin hole 57 and provide an exposed locating surface 49 at one portion of pin hole 27 which is used during forming of the center bar assembly and to positively locate the thickness of the outer shell or encasing material between the side surfaces 52 and the metal rib 46. The passage holes 48 permit good distribution of the plastic material and good securing of the metal rib 46 in the central bar assembly 12. The ramp edges 21 and 53 provided on the side bar members 14 and on the center bar assembly 12, permit easy passage onto and off of the conveyor chain 10 for products which this conveyor chain will move from one location to another. This type of conveyor chain 10 can be used in areas of extended distances where water may be prevalent for the plant's operation and where sharp or substantially sharp travel curves are necessary. The plastic characteristics of the encasing materials are such that lubrication is not required. Thus, eliminating the need for lubricating the conveyor chain. This is important particularly where water is prevalent. It eliminates the necessity of putting the lubricant on the chain members which in turn will pass onto the items being carried; and also, eliminates the cost of this type of maintenance service. The deterioration of the conveyor chain due to rusting is also eliminated, and the chain surface does not scratch, damage, et cetera, merchandise carried on it.

While but one form of the structure of the invention has been shown and described, other forms within the spirit and scope of the structure of this invention will now be apparent to those skilled in the art. Therefore, the embodiment shown in the drawings is to be considered as merely set forth for illustrative purposes, and is not intended to limit the scope of the invention herein described and shown.

Other modes of applying the principles of my invention may be employed instead of those explained, change being made as regards the means herein disclosed, provided those stated by any of the following claims or their equivalent be employed.

I therefore particularly point out and distinctly claim as my invention:

1. A plastic encased metal ribbed flexible conveyor chain comprising, in combination:
   a. at least one outer chain assembly;
   b. said outer chain assembly having two side bar members;
   c. a pin hole near each end of said side bar member;
   d. a metal rib running the length of said side bar member;
   e. a pair of pin members;
   f. securing means to position said pin members in said pin holes to align said side bar members;
   g. at least two center bar assemblies;
   h. an elongated hole in each end of said center bar assembly;
   i. a metal rib running the length of said center bar assembly;
   j. said center bar assemblies having tapered ends;
   k. said side bar members having an outer surface and an inside surface;
   l. said side bar members having load sections substantially at said pin holes;
   m. an outer tapered surface as part of said inside surface and extending from the pin hole to the end of said side bar member in the direction of the outside surface; and
   n. an inner tapered surface as part of said inside surface and extending from the pin hole to the middle of said side bar member in the direction of the outside surface.

2. A conveyor chain as claimed in claim 1, including:
   a. a circumferential surface around the outside of said side bar members; and
   b. a first ramp edge connecting said outer surface and said circumferential surface.

3. A conveyor chain as claimed in claim 2, including:
   a. an outer surface extending around said center bar assembly;
   b. side surfaces as part of said center bar assembly; and
   c. a second ramp edge connecting said outer surface and said side surfaces of said center bar assembly.

4. A conveyor chain as claimed in claim 1, including:
   a. said pin holes include a knurl hole and a pin body hole;

b. said pin member includes two knurl ends and a body surface;
c. shoulders connecting said knurl ends and said body surface;
d. a shoulder surface connecting said pin body hole and said knurl hole;
e. said knurl end acting in said knurl hole as part of said securing means;
f. said body surface acting in said pin body hole; and
g. said shoulder acting on said shoulder surface to assist in placing said side bar members a predetermined space apart.

* * * * *